United States Patent
Gross et al.

(10) Patent No.: US 7,455,899 B2
(45) Date of Patent: Nov. 25, 2008

(54) NON-WHITE CONSTRUCTION SURFACE

(75) Inventors: Christopher L. Gross, Woodbury, MN (US); Joseph Graham, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/680,693

(22) Filed: Oct. 7, 2003

(65) Prior Publication Data

US 2005/0074580 A1 Apr. 7, 2005

(51) Int. Cl.
  *B32B 5/16* (2006.01)
  *B05D 5/06* (2006.01)
(52) U.S. Cl. .............. 428/145; 428/143; 428/403; 427/214
(58) Field of Classification Search ............... 428/145, 428/143, 403; 427/214
  See application file for complete search history.

(56) References Cited

U.S. PATENT DOCUMENTS

| | | |
|---|---|---|
| 1,677,701 A | 7/1928 | Alton |
| RE19,372 E | 11/1934 | Walton |
| 2,001,448 A | 5/1935 | Beasley |
| RE20,295 E | 3/1937 | Fisher |
| 2,142,540 A | 1/1939 | Veazey |
| 2,379,358 A | 6/1945 | Jewett |
| 2,695,851 A | 11/1954 | Lodge |
| 2,732,311 A | 1/1956 | Hartwright |
| 2,898,232 A | 8/1959 | Miller et al. |
| 2,963,378 A | 12/1960 | Palmquist et al. |
| 2,981,636 A | 4/1961 | Lodge et al. |
| 2,986,476 A | 5/1961 | Larsen |
| 3,208,871 A * | 9/1965 | Langseth et al. ............ 428/145 |
| 3,255,031 A | 6/1966 | Lodge et al. |
| 3,397,073 A | 8/1968 | Fehner |

(Continued)

FOREIGN PATENT DOCUMENTS

DE 10204829 C1 7/2003

(Continued)

OTHER PUBLICATIONS

Hashem Akbari et al., "A Review of Methods for the Manufacture Of Residential Roofing Surfaces", Dated Jun. 2003 (presumed published on the web no latter than Aug. 22, 2003), Lawrence Berkeley National Laboratory, Berkeley, CA.*

(Continued)

*Primary Examiner*—William P Watkins, III
(74) *Attorney, Agent, or Firm*—Colene H. Blank

(57) ABSTRACT

Provides a non-white construction surface comprising a substrate, a first reflective coating on at least a portion of an outer surface of the substrate, the coated substrate exhibiting a minimum direct solar reflectance value of at least about 25%, and a second reflective coating on at least a portion of the first reflective coating, wherein the combination of the first reflective coating and the second reflective coating provide the substrate with at least one of (i) a reflectivity of at least about 20% at substantially all points in the wavelength range between 770 and 2500 nm, and (ii) a summed reflectance value of at least 7000 as measured in the range between 770 and 2500 nm inclusive. Also provided are various substrates having the coatings described as well as methods of providing the described construction surfaces.

13 Claims, 1 Drawing Sheet

U.S. PATENT DOCUMENTS

| | | | |
|---|---|---|---|
| 3,479,201 A * | 11/1969 | Sloan | 428/145 |
| 3,507,676 A | 4/1970 | McMahon | |
| 3,528,842 A | 9/1970 | Skadulis | |
| 3,752,696 A | 8/1973 | Beyard et al. | |
| 3,932,143 A | 1/1976 | Marshall et al. | |
| 3,945,945 A | 3/1976 | Kiovsky et al. | |
| 3,985,540 A | 10/1976 | Flin et al. | |
| 4,092,441 A | 5/1978 | Meyer | |
| 4,359,505 A | 11/1982 | Joedicke | |
| 4,378,408 A | 3/1983 | Joedicke | |
| 4,430,108 A | 2/1984 | Hojaji et al. | |
| 4,486,237 A | 12/1984 | Paffoni et al. | |
| 4,523,953 A | 6/1985 | Paffoni et al. | |
| 4,582,425 A | 4/1986 | Rabine et al. | |
| 4,583,486 A | 4/1986 | Miller | |
| 4,631,267 A | 12/1986 | Lachman et al. | |
| 4,717,614 A | 1/1988 | Bondoc et al. | |
| 4,900,583 A | 2/1990 | Hirabayashi et al. | |
| 4,916,014 A | 4/1990 | Weber et al. | |
| 4,920,090 A | 4/1990 | Ritter et al. | |
| 4,946,505 A | 8/1990 | Jungk | |
| 5,022,897 A | 6/1991 | Balcar et al. | |
| 5,039,311 A | 8/1991 | Bloecher | |
| 5,052,162 A | 10/1991 | Bush et al. | |
| 5,147,686 A | 9/1992 | Ichimura et al. | |
| 5,194,113 A | 3/1993 | Lasch et al. | |
| 5,283,080 A | 2/1994 | Lamb et al. | |
| 5,310,803 A | 5/1994 | Hansen | |
| 5,356,664 A | 10/1994 | Narayan et al. | |
| 5,362,566 A | 11/1994 | George et al. | |
| 5,366,767 A | 11/1994 | Howard | |
| 5,380,552 A | 1/1995 | George et al. | |
| 5,411,803 A | 5/1995 | George et al. | |
| 5,427,771 A | 6/1995 | Grollier et al. | |
| 5,516,573 A | 5/1996 | George et al. | |
| 5,599,586 A | 2/1997 | Israel | |
| 5,723,516 A | 3/1998 | Bigham et al. | |
| 5,731,369 A | 3/1998 | Mahoney | |
| 5,733,842 A | 3/1998 | Gerdes et al. | |
| 5,811,180 A | 9/1998 | Berdahl | |
| 5,928,761 A | 7/1999 | Hedblom et al. | |
| 5,962,143 A | 10/1999 | Krauthauser et al. | |
| 5,975,988 A | 11/1999 | Christianson | |
| 6,017,981 A | 1/2000 | Hugo | |
| 6,045,609 A | 4/2000 | Guillaumon et al. | |
| 6,063,849 A | 5/2000 | Morris et al. | |
| 6,086,667 A | 7/2000 | Guillaumon et al. | |
| 6,120,913 A | 9/2000 | Kluttz et al. | |
| 6,174,360 B1 | 1/2001 | Sliwinski et al. | |
| 6,214,466 B1 | 4/2001 | Joedicke | |
| 6,217,252 B1 | 4/2001 | Tolliver et al. | |
| 6,235,105 B1 | 5/2001 | Hubbard et al. | |
| 6,235,372 B1 | 5/2001 | Joedicke | |
| 6,238,794 B1 | 5/2001 | Beesley et al. | |
| 6,245,381 B1 | 6/2001 | Israel | |
| 6,261,694 B1 * | 7/2001 | Iacovangelo | 428/412 |
| 6,306,795 B1 | 10/2001 | Ryan et al. | |
| 6,339,898 B1 | 1/2002 | Toye | |
| 6,366,397 B1 | 4/2002 | Genjima et al. | |
| 6,376,075 B1 | 4/2002 | Tacke-Willensen et al. | |
| 6,451,874 B1 | 9/2002 | Purgett et al. | |
| 6,454,848 B2 | 9/2002 | Sliwinski et al. | |
| 6,495,074 B1 | 12/2002 | Carr | |
| 6,521,004 B1 | 2/2003 | Culler et al. | |
| 6,521,038 B2 | 2/2003 | Yanagimoto et al. | |
| 6,533,961 B2 | 3/2003 | Harelstad et al. | |
| 6,548,145 B2 * | 4/2003 | Joedicke | 428/145 |
| 6,569,520 B1 * | 5/2003 | Jacobs | 428/330 |
| 6,572,784 B1 | 6/2003 | Coombs et al. | |
| 6,596,070 B1 | 7/2003 | Schmidt et al. | |
| 6,599,355 B1 | 7/2003 | Schmidt et al. | |
| 6,607,781 B2 | 8/2003 | Joedicke | |
| 6,610,147 B2 | 8/2003 | Aschenbeck | |
| 6,692,824 B2 | 2/2004 | Benz et al. | |
| 7,241,500 B2 * | 7/2007 | Shiao et al. | 428/402 |
| 2002/0092596 A1 | 7/2002 | Phillips et al. | |
| 2002/0095871 A1 | 7/2002 | McArdle et al. | |
| 2002/0098110 A1 | 7/2002 | Graham et al. | |
| 2002/0160151 A1 | 10/2002 | Pinault et al. | |
| 2002/0179835 A1 * | 12/2002 | Feygin | 250/332 |
| 2003/0031850 A1 | 2/2003 | Scharnke et al. | |
| 2003/0035972 A1 | 2/2003 | Hanson et al. | |
| 2003/0037698 A1 | 2/2003 | Kiik et al. | |
| 2003/0044525 A1 | 3/2003 | Aschenbeck | |
| 2003/0068303 A1 | 4/2003 | Selvig et al. | |
| 2003/0068469 A1 | 4/2003 | Aschenbeck et al. | |
| 2003/0091795 A1 | 5/2003 | Kiik et al. | |
| 2003/0091814 A1 | 5/2003 | Benz et al. | |
| 2003/0108668 A1 | 6/2003 | Joedicke | |
| 2003/0148093 A1 | 8/2003 | Gorny et al. | |
| 2003/0152747 A1 | 8/2003 | Fensel et al. | |
| 2003/0198813 A1 | 10/2003 | Howell | |
| 2003/0203145 A1 | 10/2003 | Zanchetta et al. | |
| 2003/0219563 A1 | 11/2003 | Zanchetta et al. | |
| 2004/0009319 A1 | 1/2004 | Zanchetta et al. | |
| 2004/0110639 A1 | 6/2004 | Joedicke | |
| 2005/0072110 A1 | 4/2005 | Shiao et al. | |
| 2005/0072114 A1 | 4/2005 | Shiao et al. | |
| 2005/0129964 A1 | 6/2005 | Hugo | |

FOREIGN PATENT DOCUMENTS

| | | |
|---|---|---|
| EP | 0 187 688 | 7/1986 |
| EP | 0 909 747 | 4/1999 |
| EP | 1 160 299 | 12/2001 |
| FR | 2 785 306 | 5/2000 |
| FR | 2 828 220 | 2/2003 |
| GB | 2 388 815 | 11/2003 |
| JP | 60-147276 | 3/1985 |
| JP | 11-240099 | 9/1999 |
| JP | 2000-93890 | 4/2000 |
| JP | 2002-338317 | 11/2002 |
| JP | 2003-71963 | 3/2003 |
| WO | WO 96/07538 | 3/1996 |
| WO | WO 01/71121 | 9/2001 |
| WO | WO 02/10244 A2 | 2/2002 |
| WO | WO 02/16127 | 2/2002 |
| WO | WO 02/46550 | 6/2002 |
| WO | WO 03/026883 | 4/2003 |
| WO | WO 03/059557 A1 | 7/2003 |
| WO | WO 03/066746 A1 | 8/2003 |

OTHER PUBLICATIONS

"Index of /assets/docs/Papers", downloaded from http://coolcolors.lbl.gov/assets/docs/Papers/ on May 25, 2006.*

Wiel, Stephen. *Development of Cool Colored Roofing Materials.* "Cool Roof Colored Materials: Monthly Progress Report for Dec. 2002." Jan. 9, 2003. California Energy Commission. <http://coolcolors.lbl.gov/>.

Wiel, Stephen. *Development of Cool Colored Roofing Materials.* "Cool Roof Colored Materials: Monthly Progress Report for Mar. 2003." California Energy Commission. <http://coolcolors.lbl.gov/>.

Wiel, Stephen. *Development of Cool Colored Roofing Materials.* "Cool Roof Colored Materials: Monthly Progress Report for Jun. 2003." California Energy Commission. <http://coolcolors.lbl.gov/>.

Akbari, Hashem. *Development of Cool Colored Roofing Materials.* "Cool Roof Colored Materials—Minutes of Sep. 11, 2003 PAC Meeting." California Energy Commission. <http://coolcolors.lbl.gov/>.

"Quantum Yields of Active Oxidative Special Formed on $TiO_2$ Photocatalyst," J. Photochem and Photobiology A: Chemistry 2000, vol. 134, pp. 139-142.

Jiang, et al., "Novel Pigment Approaches in Optically Variable Security Inks Including Polarizing Cholesteric Liquid Crystal (CLC) Polymers", Optical Security and Counterfeit Deterrence Techniques, IV, SPIE 4677, 2002.

Germer et al., "Modeling The Appearance of Special Effect Pigment Coatings", Surface Scattering and Diffraction for Advanced Metrology, Proc., SPIE 4447, pp. 77-86, 2001.

"Development of Cool Colored Roofing Materials", Project Advisory Committee Meeting, National Laboratory and Livermore Berkeley National Laboratory, 55 pages, Mar. 11, 2003.

ASTM Designation: G159-98, "Standard Table for References Solar Spectral Irradiance at Air Mass 1.5: Direct Normal and Hemispherical for a 37° Tilted Surface", pp. 1-10, Published Mar. 1999.

* cited by examiner

NON-WHITE CONSTRUCTION SURFACE

FIELD

The present invention relates to reflective coatings for enhancing solar reflectivity for use on roofs, such as on asphalt shingles, and other exterior surfaces.

BACKGROUND

For energy conservation purposes, it has become more desirable to reflect solar energy off of roofs and other exterior surfaces. Absorbed solar energy increases energy costs in buildings. In addition, in densely populated areas, such as metropolitan areas, the absorption of solar energy increases ambient air temperatures. A primary absorber of solar energy is building roofs. It is not uncommon for ambient air temperature in metropolitan areas to be 10° F. or more warmer than in surrounding rural areas. This phenomenon is commonly referred to as the urban heat island effect. Reflecting solar energy rather than absorbing it can reduce cooling costs and thereby energy costs in buildings. In addition, reducing solar energy absorption can enhance the quality of life in densely populated areas by helping to decrease ambient air temperatures.

Solar energy reflection can be achieved by using metallic or metal-coated roofing materials. However, because the heat emittance of metallic or metal-coating roofing materials is low, such materials do not produce significant gains in energy conservation and reduced costs since such materials restrict radiant heat flow.

Reflection of solar energy can also be accomplished by using white or light-colored roofs. However, white or light-colored sloped roofs are not accepted in the marketplace due to aesthetic reasons. Instead, darker roofs are preferred. However, darker roofs by their very nature through colored or non-white roofing materials absorb a higher degree of solar energy and reflect less.

Non-flat or sloped roofs typically use shingles coated with colored granules adhered to the outer surface of the shingles. Such shingles are typically made of an asphalt base with the granules embedded in the asphalt. The roofing granules are used both for aesthetic reasons and to protect the underlying base of the shingle. The very nature of such granules creates significant surface roughness on the shingle. Solar radiation thereby encounters decreased reflectivity since the radiation is scattered in a multi-scattering manner that leads to increased absorption when compared to the same coating placed on a smooth surface.

SUMMARY

The present invention provides a non-white construction surface comprising a substrate, a first reflective coating on at least a portion of an outer surface of a substrate, such that the substrate with this first reflective coating exhibits a minimum direct solar reflectance value of at least about 25%, and a second reflective coating on at least a portion of the first reflective coating, wherein the combination of the first reflective coating and the second reflective coating provide the substrate with a reflectivity of at least about 20% at substantially all points in the wavelength range between 770 and 2500 nm.

In another aspect, the invention provides a non-white construction surface comprising a substrate, a first reflective coating on at least a portion of an outer surface of a substrate, such that the substrate with this first reflective coating exhibits a minimum direct solar reflectance value of at least about 25%, and a second reflective coating on at least a portion of the first reflective coating, wherein the combination of the first reflective coating and the second reflective coating provide the substrate with a summed reflectance value of at least about 7,000 as measured in the range between 770 and 2500 nm inclusive.

In another aspect, the invention provides a method of producing a non-white construction surface comprising applying a first coating solution to at least a portion of an outer surface of a substrate, curing the first coating solution to form a first reflective coating to form a coated substrate, the first reflective coating exhibiting a minimum direct solar reflectance value of at least about 25%, applying a second coating solution over at least a portion of the coated substrate, and curing the second coating solution to form a second reflective coating wherein the combination of the first reflective coating and the second reflective coating provide at least one of (i) a reflectivity of at least about 20% at substantially all points in the wavelength range between 770 and 2500 nm, and (ii) a summed reflectance value of at least 7000 as measured in the range between 770 and 2500 nm inclusive.

In yet another aspect, the invention provides a non-white construction surface comprising an inorganic, non-metallic substrate, a first reflective coating on at least a portion of an outer surface of the substrate, the coated substrate exhibiting a minimum direct solar reflectance value of at least about 25%, and a second reflective coating on at least a portion of the first reflective coating, wherein the combination of the first reflective coating and the second reflective coating provide the substrate with at least one of (i) a reflectivity of at least about 20% at substantially all points in the wavelength range between 770 and 2500 nm, and (ii) a summed reflectance value of at least 7000 as measured in the range between 770 and 2500 nm inclusive.

It is an advantage of the present invention in one aspect to provide construction substrates having solar energy reflecting properties. Examples of construction substrates include roofing shingles and tiles. Other features and advantages of the invention will be apparent from the following detailed description of the invention and the claims. The above summary is not intended to describe each illustrated embodiment or every implementation of the present disclosure. The description that follows more particularly describes and exemplifies certain preferred embodiments using the principles disclosed herein.

DETAILED DESCRIPTION

Figure 1:
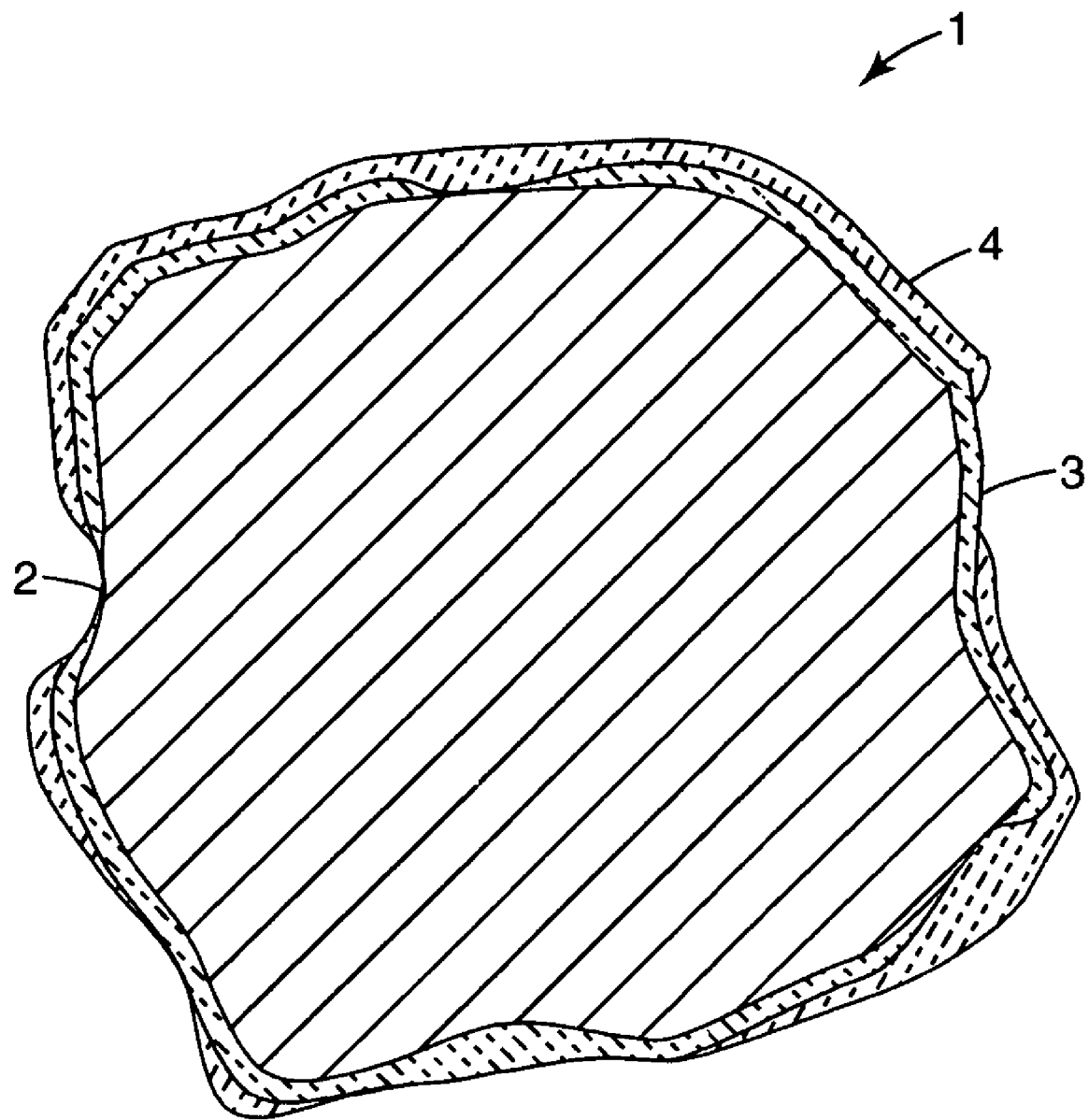
FIG. 1 shows a roofing granule comprising a substrate, a first coating, and a second coating according to one embodiment of the present invention.

The present invention includes a non-white construction surface comprising a coated substrate such as granules for use in roofing that have enhanced solar reflectivity relative to conventional roofing granules. The enhanced reflectivity is obtained by first providing a reflective primary or undercoating to the substrate granules and then providing a secondary coating over the undercoating with the secondary coating containing a non-white pigment. In some embodiments, the pigment may have enhanced reflectivity in the near-infrared (NIR) (700-2500 nm) portion of the solar spectrum. In some embodiments, the substrate is inorganic and non-metallic. Although roofing granules will be referred to throughout the description, the undercoating and outer coating may be placed on other construction surfaces such as glass, tile such as clay or concrete tile, roof substances, concrete, rock, which materials can be, but need not be, in granular form.

It has been discovered that roofing granules consisting of a base mineral coated with a reflective primary or undercoat and a secondary or outer coating containing non-white pigments exhibit enhanced solar reflectivity with respect to granules of similar visible color having a single coating. In some embodiments the resulting reflectivity exceeds at least 20% at the wavelengths of interest. Solar reflectivity values of at least 25% meet the present solar reflectivity standard set forth by the U.S. Environmental Protection Agency (EPA) under the program entitled "Energy Star". The phrase solar reflectivity and direct solar reflectance are used interchangeably in the present application. The EPA permits manufacturers to use the designation "Energy Star" for those roofing products that meet certain energy specifications. This "Energy Star" designation is a desirable designation to place on roofing products. In some embodiments, the present invention employs colored pigments that exhibit enhanced reflectivity in the NIR portion of the solar spectrum as compared to previous colorants. The NIR comprises approximately 50-60% of the sun's incident energy. Improved reflectivity in the NIR portion of the solar spectrum leads to significant gains in energy efficiency and such pigments are useful in some embodiments of the present invention.

By direct solar reflectance is meant that fraction reflected of the incident solar radiation received on a surface perpendicular to the axis of the radiation within the wavelength range of 300 to 2500 nm as computed according to a modification of the ordinate procedure defined in ASTM Method G159. A spreadsheet, available upon request from Lawrence Berkley Laboratory, Berkley, Calif., combining the direct and hemispherical Solar Irradiance Air Mass 1.5 data from ASTM method G159 was used to compute interpolated irradiance data at 5 nm intervals in the region of interest. The 5 nm interval data was used to create weighting factors by dividing the individual irradiances by the total summed irradiance from 300 to 2500 nm. The weighting factors were then multiplied by the experimental reflectance data taken at 5 nm intervals to obtain the direct solar reflectance at those wavelengths.

By summed reflectance value is meant the sum of the numerical value of the discrete percentage reflectance measured at 5 nm intervals in the range between 770 and 2500 nm inclusive.

CIELAB is the second of two systems adopted by CIE in 1976 as models that better showed uniform color spacing in their values. CIELAB is an opponent color system based on the earlier (1942) system of Richard Hunter called L, a, b. Color opposition correlates with discoveries in the mid-1960s that somewhere between the optical nerve and the brain, retinal color stimuli are translated into distinctions between light and dark, red and green, and blue and yellow. CIELAB indicates these values with three axes: L*, a*, and b*. (The full nomenclature is 1976 CIE L*a*b* Space.) The central vertical axis represents lightness (signified as L*) whose values run from 0 (black) to 100 (white). The color axes are based on the fact that a color cannot be both red and green, or both blue and yellow, because these colors oppose each other. On each axis the values run from positive to negative. On the a-a' axis, positive values indicate amounts of red while negative values indicate amounts of green. On the b-b' axis, yellow is positive and blue is negative. For both axes, zero is neutral gray.

For the purposes of this application, articles having a color falling within the inverted conical volume defined by the equation:

$$-(L^*)+[((L_0^*)+(y(a^*)^2+z(b^*)^2)^{0.5})/x] \leq 0$$

where $L_0^*=67$, $x=1.05$, $y=1.0$, $z=1.0$ and the values, $L^*$, $a^*$, and $b^*$, are defined on the CIE $L^*a^*b^*$ scale are said to be white and articles having a color falling outside the cone are said to be non-white.

Values of the color space corresponding to white fall within the cone close to the vertical $L^*$ axis, are not strongly colored as indicated by their small displacements along either or both of the $a^*$ and $b^*$ axes, and have a relatively high degree of lightness as indicated by an $L^*$ greater than $L_0^*$. $L_0^*$ is the vertex of the cone.

Referring now to FIG. 1, a non-white construction surface is shown in the embodiment of a solar-reflective roofing granule (1). A first reflective coating (3) is applied over at least a portion of the surface of substrate (2), which in this embodiment is a base roofing granule. A second reflective coating (4) is applied over at least a portion of first reflective coating (3). Although the coatings are preferably continuous in most embodiments of the invention, incidental voids in either coating or in both coatings are acceptable in some aspects, such as when the overall coated construction surface possesses the necessary reflective properties. Additional layers also may be used.

In one aspect of the invention, the preferred pigment for use as the undercoating (or primary coating) is titanium dioxide ($TiO_2$). Other suitable pigments for the undercoating include V-9415 and V-9416 (Ferro Corp., Cleveland, Ohio) and Yellow 195 (the Shepherd Color Company, Cincinnati, Ohio), all of which are considered yellow pigments. The primary undercoating can be any color such that the resulting layer exhibits a minimum direct solar reflectance of at least about 25%.

In some embodiments, the secondary or outermost coating includes those pigments having enhanced NIR reflectivity. Suitable pigments for this coating include those described above, as well as: "10415 Golden Yellow", "10411 Golden Yellow", "10364 Brown", "10201 Eclipse Black", "V-780 IR BRN Black", "10241 Forest Green", "V-9248 Blue", "V-9250 Bright Blue", "F-5686 Turquoise", "10202 Eclipse Black", "V-13810 Red", "V-12600 IR Cobalt Green", "V-12650 Hi IR Green", "V-778 IR Brn Black", "V-799 Black", and "10203 Eclipse Blue Black" (from Ferro Corp.); and Yellow 193, Brown 156, Brown 8, Brown 157, Green 187B, Green 223, Blue 424, Black 411, Black 10C909 (from Shepherd Color Co.). These pigments also are useful in the undercoating.

The resulting coated granule of the present invention is non-white in color. A white granule which would have acceptable solar reflectivity is not, however widely acceptable to the marketplace.

The process for coating the granules of the present invention is generally described in U.S. Pat. Nos. 6,238,794 and 5,411,803, herein incorporated by reference. The substrate used for the granules of the present invention is inorganic. The inorganic substrate may be selected from any one of a wide class of rocks, minerals or recycled materials. Examples of rocks and minerals include basalt, diabase, gabbro, argillite, rhyolite, dacite, latite, andesite, greenstone, granite, silica sand, slate, nepheline syenite, quartz, or slag (recycled material).

Preferably, the inorganic material is crushed to a particle size having a diameter in the range of about 300 micrometers (μm) to about 1800 μm.

The coatings used to supply the pigments in both the under or primary coating, and the secondary or outer coating can have essentially the same constituents except for the pigment. The coatings are formed from an aqueous slurry of pigment, alkali metal silicate, an aluminosilicate, and an optional borate compound. The alkali metal silicate and the aluminosilicate act as an inorganic binder and are a major constituent of the coating. As a major constituent, this material is present at an amount greater than any other component and in some embodiments present at an amount of at least about 50 volume percent of the coating. The coatings from this slurry are generally considered ceramic in nature.

Aqueous sodium silicate is the preferred alkali metal silicate due to its availability and economy, although equivalent materials such as potassium silicate may also be substituted wholly or partially therefore. The alkali metal silicate may be designated as $M_2O:SiO_2$, where M represents an alkali metal such as sodium (Na), potassium (K), mixture of sodium and potassium, and the like. The weight ratio of $SiO_2$ to $M_2O$ preferably ranges from about 1.4:1 to about 3.75:1. In some embodiments, ratios of about 2.75:1 and about 3.22:1 are particularly preferred, depending on the color of the granular material to be produced, the former preferred when light colored granules are produced, while the latter is preferred when dark colored granules are desired.

The aluminosilicate used is preferably a clay having the formula $Al_2Si_2O_5(OH)_4$. Another preferred aluminosilicate is kaolin, $Al_2O_3.2SiO_2.2H_2O$, and its derivatives formed either by weathering (kaolinite), by moderate heating (dickite), or by hypogene processes (nakrite). The particle size of the clay is not critical to the invention; however, it is preferred that the clay contain not more than about 0.5 percent coarse particles (particles greater than about 0.002 millimeters in diameter). Other commercially available and useful aluminosilicate clays for use in the ceramic coating of the granules in the present invention are the aluminosilicates known under the trade designations "Dover" from Grace Davison, Columbia, Md. and "Sno-brite" from Unimin Corporation, New Canaan, CT.

The borate compound, when incorporated, is present at a level of at least about 0.5 g per kg of substrate granules but preferably not more than about 3 g per kg of substrate granules. The preferred borate compound is sodium borate available as Borax® (U.S. Borax Inc., Valencia, Calif.); however, other borates may be used, such as zinc borate, sodium fluoroborate, sodium tetraborate-pentahydrate, sodium perborate-tetrahydrate, calcium metaborate-hexahydrate, potassium pentaborate, potassium tetraborate, and mixtures thereof. An alternative borate compound is sodium borosilicate obtained by heating waste borosilicate glass to a temperature sufficient to dehydrate the glass.

Inorganic substrate granules, preheated to a temperature range of about 125-140° C. in a rotary kiln or by equivalent means, are then coated with the slurry to form a plurality of slurry-coated inorganic granules. The water flashes off and the temperature of the granules drops to a range of about 50-70° C. The slurry-coated granules are then heated for a time and at a temperature sufficient to form a plurality of ceramic-coated inorganic granules. Typically and preferably the slurry-coated granules are heated at a temperature of about 400° C. to about 530° C. for a time ranging from about 1 to about 10 minutes. Those skilled in the art will recognize that shorter times may be used at higher temperatures. The heat typically and preferably emanates from the combustion of a fuel, such as a hydrocarbon gas or oil. The desired color of the granules may be influenced somewhat by the combustion conditions (time, temperature, % oxygen the combustion gases, and the like).

The second or outer coating is then applied in a similar fashion.

Bituminous sheet materials such as roofing shingles may be produced using the granules of the invention. Roofing shingles typically comprise materials such as felt, fiberglass, and the like. Application of a saturate or impregnant such as asphalt is essential to entirely permeate the felt or fiberglass base. Typically, applied over the impregnated base is a waterproof or water-resistant coating, such as asphaltum, upon which is then applied a surfacing of mineral granules, which completes the conventional roofing shingle.

The following examples are provided to further illustrate aspects of the invention. The examples are not intended to limit the scope of this invention in anyway.

EXAMPLES

Materials

The following materials are used in the Examples:

Sodium silicate solution (39.4% solids, 2.75 ratio $SiO_2$ to $Na_2O$) available from PQ Corp., Valley Forge, Pa.

Kaolin clay (available as Snobrite ™ from Unimin Corporation, New Canaan, CT., typical composition: 45.5% $SiO_2$, 38.0% $Al_2O_3$, 1.65% $TiO_2$ and small amounts of $Fe_2O_3$, CaO, MgO, $K_2O$ and $Na_2O$).

Borax (Sodium Borate, 5 Mol, typical composition: 21.7% $Na_2O$, 48.8% $B_2O_3$, and 29.5% $H_2O$) available from U.S. Borax, Boron, Calif.

Titanium dioxide (Tronox® CR-800, typical composition: 95% $TiO_2$, alumina treated) available from the Kerr-McGee Corporation, Hamilton, Miss.

Pigments (10411 Golden Yellow, 10241 Forest Green, V-3810 Red, V-9250 Bright Blue) available from Ferro Corporation, Cleveland, Ohio.

Grade #11 uncoated roofing granules (quartz lattite/dacite porphyry) (available from 3M Company, St. Paul, Minn.) specified by the following ranges (as per ASTM D451):

TABLE 1

| U.S. Sieve No. | Nominal Opening | % Retained Minimum | % Retained Maximum | Target | Typical |
|---|---|---|---|---|---|
| 8 | 2.36 mm | 0 | 0.1 | — | — |
| 12 | 1.70 mm | 4 | 10 | 8 | — |
| 16 | 1.18 mm | 30.0* | 45.0* | — | 37.5 |
| 20 | 850 µm | 25.0* | 35.0* | — | 30 |
| 30 | 600 µm | 15.0* | 25.0* | — | 20 |
| 40 | 425 µm | 2.0* | 9.0* | — | 5.5 |
| −40 | −425 µm | 0 | 2 | 1 | — |

*Typical Range

Test Method 1

Reflectance measurements were made with a Perkin Elmer Lambda 900 Spectrophotometer fitted with a PELA-1000 integrating sphere accessory. This sphere is 150 mm (6 inches) in diameter and complies with ASTM methods E903, D1003, and E308 as published in "ASTM Standards on Color and Appearance Measurement," Third Ed., ASTM, 1991. Diffuse Luminous Reflectance (DLR) was measured over the spectral range of 250-2500 nm. UV-visible integration was set at 0.44 seconds. Slit width was 4 nm. A "trap" was utilized to eliminate complications arising from specular reflectance.

Measurements were all made with a clean and optically flat fused silica (quartz) plate in front of the sample or in front of a standard white plate. A cup having a diameter of about 50 mm and a depth of about 10 mm was filled with the granules to be characterized.

Test Method 2

L*a*b* color measurements were made using a Labscan XE spectrophotometer (Hunter Associates Laboratory, Reston, Va.) fitted with a sample holder and using a traversing roller to ensure that a uniformly level surface was prepared for measurement. The holder was filled to a depth of about 5 mm to ensure that the measured values were attributable to the granules. For a more detailed description of the sample holder and sample preparation refer to U.S. Pat. No. 4,582,425, which is herein incorporated by reference.

Granule Coating Method

The slurry components indicated in Table 2 were combined in a vertical mixer. 1000 parts by weight of substrate were pre-heated to 90-95° C. and then combined with the indicated amount of slurry in a vertical or horizontal mixer. Example 1 used Grade #11 uncoated roofing granules as the substrate. Examples 2-4 used granules produced as in example 1 as the substrate. The slurry coated granules were then fired in a rotary kiln (natural gas/oxygen flame) reaching the indicated temperature over a period of about 10 minutes. Following firing, the granules were allowed to cool to room temperature.

Examples 1-4

Examples 1-4 were produced by Granule Coating Method 1 and tested according to Test Methods 1 and 2. The results are summarized in Table 3.

TABLE 2

The amounts listed are in parts by weight unless otherwise indicated.

| | Example | | | |
|---|---|---|---|---|
| | 1 | 2 | 3 | 4 |
| Kaolin clay | 22.5 | 15 | 20 | 20 |
| Sodium silicate solution | 65 | 34 | 40 | 40 |
| Water | 15 | 15 | 15 | 15 |
| CR 800 titanium dioxide | 8.75 | — | 3 | 0.8 |
| 10241 Forest Green | — | 14 | — | 1.6 |
| 10411 Golden Yellow | — | 1.2 | 4 | — |
| V-13810 Red | — | — | 0.2 | — |
| V-9250 Bright Blue | — | — | — | 0.6 |
| Borax | 3 | 1 | 1 | — |
| Slurry Parts Per 1000 | 57.1 | 40.1 | 41.6 | 39.0 |
| Final Firing Temperature | 470° C. | 460° C. | 460° C. | 460° C. |

TABLE 3

| | Example | | | |
|---|---|---|---|---|
| | 1 | 2 | 3 | 4 |
| Direct Solar Reflectance (%) | 30 | 27 | 34 | 30 |
| L* | 68.75 | 55.90 | 64.40 | 62.63 |
| a* | −0.46 | −8.62 | 5.96 | −5.32 |
| b* | 1.27 | 12.45 | 26.06 | 2.29 |
| Minimum Reflectivity (770-2500 nm) | 20.53% | 29.07% | 23.83% | 20.21% |
| Summed Reflectance Value | 8560 | 12078 | 10659 | 9686 |

Although the present invention has been described with reference to preferred embodiments, workers skilled in the art will recognize that changes may be made in form and detail without departing from the spirit and scope of the invention.

We claim:

1. A non-white roofing shingle granule comprising:
    a substrate comprising a granule;
    a first white reflective coating on at least a portion of an outer surface of the substrate,
    the coated substrate exhibiting a minimum direct solar reflectance value of at least about 25%,
    the first white reflective coating comprising at least 50 vol % of an inorganic binder; and
    a second reflective coating comprising a colored pigment having enhanced NIR reflectivity on at least a portion of the first white reflective coating, wherein the combination of the first white reflective coating and the second reflective coating provide the substrate with a reflectivity of at least about 20% at substantially all points in the wavelength range between 770 and 2500 nm;
    wherein the second reflective coating has a non-metallic appearance.

2. The non-white roofing shingle granule of claim 1 wherein the second reflective coating has an inorganic binder.

3. A non-white roofing shingle granule comprising:
    a substrate comprising a granule;
    a first white reflective coating on at least a portion of an outer surface of the substrate, the coating substrate exhibiting a minimum direct solar reflectance value of at least about 25%, the first white reflective coating comprising at least 50 vol % of an inorganic binder; and
    a second reflective coating comprising a colored pigment having enhanced NIR reflectivity on at least a portion of the first white reflective coating, wherein the combination of the first white reflective coating and the second reflective coating provide the substrate with a summed reflectance value of at least about 7,000 as measured in the range between 770 and 2500 nm inclusive;
    wherein the second reflective coating has a non-metallic appearance.

4. The non-white roofing shingle granule of claim 3 wherein the second reflective coating comprises an inorganic binder.

5. A method of producing a non-white roofing shingle granule surface comprising:
    applying a first coating solution to at least a portion of an outer surface of a substrate comprising a granule;
    curing the first coating solution to form a first white reflective coating to form a coated substrate, the first white reflective coating exhibiting a minimum direct solar reflectance value of at least about 25, % and the first white reflective coating comprising at least 50 vol % of an inorganic binder;
    applying a second coating solution comprising a colored pigment having enhanced NIR reflectivity over at least a portion of the coated substrate; and
    curing the second coating solution to form second reflective coating wherein the combination of the first white reflective coating and the second reflective coating provide at least one of
    (i) a reflectivity of at least about 20 % at substantially all points in the wavelength range between 770 and 2500 nm, and
    (ii) a summed reflectance value of at least 7000 as measured in the range between 770 and 2500 nm inclusive;
    wherein the second reflective coating has a non-metallic appearance.

6. A non-white roofing shingle granule comprising:
    an inorganic, non-metallic substrate comprising a granule;

a first white reflective coating on at least a portion of an outer surface of the substrate, the coated substrate exhibiting a minimum direct solar reflectance value of at least about 25%, the first white reflective coating comprising at least 50 vol % of an inorganic binder; and a second reflective coating comprising a colored pigment having enhanced NIR reflectivity on at least a portion of the first reflective coating, wherein the combination of the first white reflective coating and the second reflective coating provide the substrate with at least one of (i) a reflectivity of at least about 20 % at substantially all points in the wavelength range between 770 and 2500 nm, and (ii) a summed reflectance value of at least 7000 as measured in the range between 770 and 2500 nm inclusive;

wherein the second reflective coating has a non-metallic appearance.

7. The non-white roofing shingle granule of claim 6 wherein the second reflective coating has an inorganic binder.

8. The non-white roofing shingle granule of claim 1 wherein the colored pigment having enhanced NIR reflectivity is selected from the group consisting of a black colored pigment, a brown colored pigment, a green colored pigment, and combinations thereof.

9. The non-white roofing shingle granule of claim 1 wherein the colored pigment having enhanced NIR reflectivity is selected from the group consisting of a yellow colored pigment, a blue colored pigment, a red colored pigment, and combinations thereof.

10. The non-white roofing shingle granule of claim 3 wherein the colored pigment having enhanced NIR reflectivity is selected from the group consisting of a black colored pigment, a brown colored pigment, and combinations thereof.

11. The non-white roofing shingle granule of claim 3 wherein the colored pigment having enhanced NIR reflectivity is selected from the group consisting of a yellow colored pigment, a blue colored pigment, a red colored pigment, a green colored pigment, and combinations thereof.

12. The method of claim 5, wherein the applying a second coating solution step comprises applying a second coating solution over at least a portion of the coated substrate, the second coating solution comprising a colored pigment having enhanced NIR reflectivity selected from the group consisting of a black colored pigment, a brown colored pigment, a red colored pigment, and combinations thereof.

13. The method of claim 5, wherein the applying a second coating solution step comprises applying a second coating solution over at least a portion of the coated substrate, the second coating solution comprising a colored pigment having enhanced NIR reflectivity selected from the group consisting of a blue colored pigment, a yellow colored pigment, a green colored pigment, and combinations thereof.

\* \* \* \* \*